United States Patent [19]

Tallaron

[11] Patent Number: 4,651,036

[45] Date of Patent: Mar. 17, 1987

[54] LOGIC DATA TRANSFER BUS PRELOADING CIRCUIT

[75] Inventor: Louis Tallaron, St. Egreve, France

[73] Assignee: Societe pour l'Etude et la Fabrication de Circuits Integres Speciaux, Grenoble, France

[21] Appl. No.: 703,885

[22] Filed: Feb. 21, 1985

[30] Foreign Application Priority Data

Feb. 24, 1984 [FR] France .................. 84 02855

[51] Int. Cl.$^4$ .................. H03K 17/687; H03K 17/08
[52] U.S. Cl. .................. 307/571; 307/200 B; 307/443; 307/574; 330/288; 323/315
[58] Field of Search .............. 323/315, 316; 307/443, 307/270, 478, 574, 581, 269, 452, 453, 246, 572, 579, 584, 448; 330/288

[56] References Cited

U.S. PATENT DOCUMENTS 4,045,684 8/1977 Eads et al. .................. 307/433
4,498,021 2/1985 Uya .................. 307/443

FOREIGN PATENT DOCUMENTS 0082980 7/1983 European Pat. Off.
3133579 3/1983 Fed. Rep. of Germany.
3228013 3/1983 Fed. Rep. of Germany.

Primary Examiner—John S. Heyman
Assistant Examiner—Trong Quang Phan

Attorney, Agent, or Firm—Oblon, Fisher, Spivak, McClelland & Maier

[57] ABSTRACT

A data transfer bus preloading circuit including a large sized transistor for ensuring rapid bus conductor preloading. This transistor is conductive at the beginning of the preloading step proper, but is blocked as the bus voltage reaches the desired preload value which corresponds to the sum of the respective threshold voltages of two other transistors of the circuit. The circuit includes five field effect transistors, two supply terminals, a preloading control input terminal and a preloading inhibiting input terminal. The large size transistor is connected between a first supply terminal and the output terminal of the circuit. A second transistor is connected between the gates of the first and third transistors. The gate of the second transistor is connected to the preloading control input terminal. The third transistor is connected between the source terminal and the fifth transistor. The gate and source of the third transistor are connected together. The fourth transistor is connected between the ground supply terminal and the gate of the first transistor. The gate of the fourth transistor is connected to the preloading inhibiting input terminal. The fifth transistor is connected between the third transistor and the ground supply terminal. The gate of the fifth transistor is connected to the output of the circuit. It is also possible to add a sixth transistor between the fifth transistor and the ground supply terminal with the drain and gate of this transistor being connected together.

3 Claims, 2 Drawing Figures

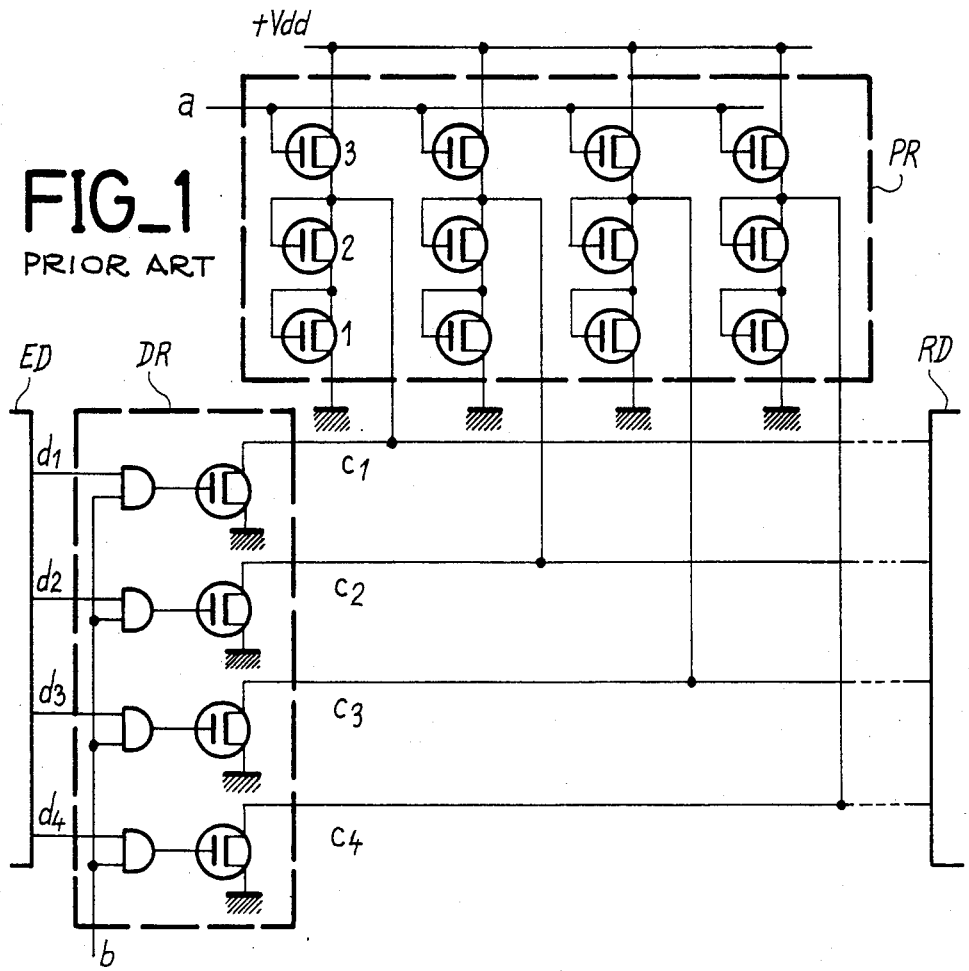
FIG_1 PRIOR ART
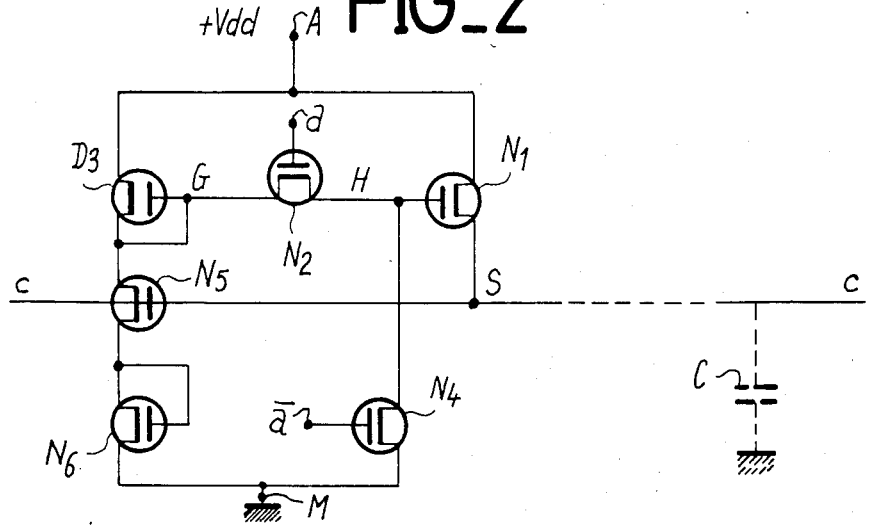
FIG_2

LOGIC DATA TRANSFER BUS PRELOADING CIRCUIT

FIELD OF THE INVENTION

The transfer of data to a bus connecting a data emitting member to a receiving member is generally effected -in logic signal processing circuits adapted to operate at high speed- in two steps for each emission-reception cycle, i.e.: a first step consists in preparing the data by the emitting member, while the receiving member is being prepared to receive the new data, and a second step consists in effectively applying the data to the bus through a driving stage, said data being then received by the receiving member.

BACKGROUND OF THE INVENTION

The data are logic signals on the "0" or "1" level. The "0" level is theoretically defined as corresponding to a voltage equal to zero Volt, while the "1" level is defined as corresponding to a voltage equal to the logic supply voltage Vdd (about 5 Volts). However, in practice, for example in the field of NMOS (N channel metal oxide semiconductor technology), level "0" is a voltage comprised between 0 and a threshold voltage Vt of the channel N MOS transistors included in the circuit, while the level "1" may be a voltage comprised between Vt and 5 Volts.

It can be observed that in most cases, especially in the field of NMOS technology, the driving stages of the bus and the data receiving member are arranged in such a manner that inducing a conductor of the bus to pass from the "1" state to the "0" state can be effected far more rapidly than inducing such conductor to pass from the "0" state to the "1" state.

For this reason, and with a view to increasing the data output rate on the bus, a circuit for preloading the bus conductors has been provided in many cases, which circuit brings all the conductors to a potential level just sufficient to define the "1" state, or substantially to define said "1" state, during the first step, or transfer preparation step, since the duration of this step is anyway longer than that of the second step (transfer step proper), said first step corresponding, for example, to the execution of the calculations the result of which constitutes the data to be transmitted; in the second step (execution of the transfer) the conductors which must pass from the "1" state are already -or are substantially already- in said "1" state, while the conductors which should pass to the zero state will reach the same rapidly. Thus the second step of the cycle may have a minimum duration corresponding to the lapse of time required for a conductor to pass from the "1" state to the "0" state, which lapse of time can be very short.

FIG. 1 shows the arrangement of a preloaded data transfer system: the data emitting member is designated by reference ED and supplies data d1, d2, d3, d4 adapted to be transferred respectively to conductors c1, c2, c3, c4 of data transfer bus, with a view to being transmitted to a data receiving member RD.

A driving stage DR of the bus is interposed between the data output terminals of the emitting member ED and the bus conductors. This driving stage comprises, for example, for each conductor one AND gate receiving a data output and a transfer control signal, as well as a MOS transistor controlled by said gate and adapted to connect the corresponding conductor to the ground, or to isolate said conductor with respect to the ground, depending on the state of the output terminal of said AND gate.

The transfer control signal is at logic level "1" during the transfer step b (second step) of each data transmission cycle.

Furthermore a preloading circuit PR controlled by a preloading control signal at level "1" during the preloading step a (first step) of each cycle allows each bus conductor to be preloaded so as to bring it approximately to logic state "1". Step a and step b are distinct from each other or are strictly complementary.

In one arrangement according to the prior art, shown in FIG. 1, the preloading circuit comprises for each bus conductor to be preloaded three channel N MOS transistors connected in series between the ground and a general positive supply voltage Vdd. The conductor to be preloaded is connected between the second transistor and the third transistor (the latter being also connected to Vdd and receiving at its gate the preloading control signal a); the first and second transistors have their respective gates connected to their drain.

In this circuit arrangement the third transistor, from the very start of the preloading step a, is getting conductive and starts loading the capacity (which may be or not be a parasite capacity) defined by the conductor that is statically in a state of high impedance, at its input terminals as well as at its output terminal. In order that the loading can be effected rapidly, i.e. in order that the conductor reaches rapidly a predetermined preloading voltage, the third transistor should preferably be of a comparatively large size. When the voltage of the conductor reaches 2Vt, i.e. the sum of the threshold voltages of the first and second transistors, respectively, the latter will become conductive and stabilize the bus conductor preload voltage at a value of 2Vt. From this moment on, the preloading process is terminated.

When step a has been accomplished the third transistor will get blocked, and the bus conductors remain in the preloaded state. During step b, the data are applied through the driving stage.

The main drawback of this preloading circuit resides in the fact that between the instant when the bus conductor reaches the specified preloading voltage (2Vt in the example shown; another value might be selected, for instance Vt, or 3Vt, etc . . . ) and the end of the preloading step a great amount of current is consumed, since all three transistors are conductive. If the bus conductor had already been at level "1", this current consumption occurs during the entire preloading step. Given a bus having 32 conductors, this would result in 32 groups of simultaneously conductive transistors, thus involving a power consumption which may be very important, whereas it is attempted generally to reduce by any imaginable means the current consumption of the circuits.

SUMMARY OF THE INVENTION

The present invention provides a novel preloading circuit which allows the power consumed during the preloading step to be substantially reduced.

The novel circuit comprises, for each conductor to be preloaded, two supply terminals, one output terminal adapted to be connected to the bus conductor to be preloaded, a preloading control input terminal, and a preloading inhibiting input terminal.

According to the invention the circuit is constituted as follows: a first transistor is connected between a first supply terminal and the output terminal; a second transistor is connected between the gate of said first transistor and the source of a third transistor, while its gate is controlled by the preloading control input, the third transistor being connected to the first supply terminal; a fourth transistor is connected between the gate of said first transistor and said second supply terminal and has its gate connected to the preloading inhibiting input terminal; at least one fifth transistor is connected in series between the source of said third transistor and said second supply terminal, the gate of said fifth transistor being connected to the outlet terminal.

Preferably a sixth transistor is connected in series between said fifth transistor and said supply terminal and has its drain connected to its gate.

Said third transistor preferably is a depletion transistor (negative threshold voltage) and has its gate connected to its source.

Other features, objects and advantages of the invention will become apparent from the detailed description herein-after which is given with reference to the appended drawing, by way of illustration, but not of limitation.

BRIEF DESCRIPTION OF THE DRAWING

In the drawing

FIG. 1 which has already been described herein-above, shows a known data transfer system;

FIG. 2 shows a preloading circuit according to the present invention for a single bus conductor.

DESCRIPTION OF A PREFERRED EMBODIMENT OF THE INVENTION

The circuit shown in FIG. 2 is designed to be substituted for any one of the groups comprising three preloading transistors as shown in FIG. 1.

The circuit according to FIG. 2 comprises the above-defined components, in which the transistors are channel N MOS transistors (since this circuit is particularly adapted to a NMOS technology) designated respectively by references N1, N2, D3, N4, N5, N6, as regards the first, second, third, fourth, fifth and sixth transistors. Transistor D3 is a depletion layer transistor (negative threshold voltage), while transistors N1, N2, N4, N5 and N6 are "normal" transistors having a positive threshold voltage Vt which is the same for all these transistors; all said transistors are formed on one common integrated circuit "chip" containing the bus to be preloaded.

The supply terminals of the circuit are designated by references A (positive voltage Vdd) and M (ground at zero reference potential).

The preloading control input terminal is designated by reference a as well as the preloading step a during which the input terminal is brought to a logical level "1".

The preloading inhibiting input terminal is designated by reference $\bar{a}$ and as a rule receives a signal which is complementary to the preloading control signal; it should be understood, however, that this input terminal may also receive a different signal, provided that it is disconnected from the preloading step a. For example, inhibiting inlet terminal $\bar{a}$ might receive the data transfer control signal b mentioned herein-above with reference to FIG. 1.

The output terminal of the circuit is designated by reference S and is connected to the conductor to be preloaded, which is designated by reference c.

In the figure, conductor c is represented with a parallel equivalent capacity C (is dashed lines) which represents its capacity properly speaking and the capacity of the members (not shown) to which said conductor c is connected (for example, grids of MOS transistors of the data receiving member in FIG. 1).

The circuit operates as follows: at the beginning of the preloading step a, transistor N2 becomes conductive, whereas depleteion layer transistor D3 is naturally permanently conductive. Thereby transistor N1 is rendered conductive and the potential of bus conductor c increases under the effect of a progressive load applied to its equivalent capacity C.

As long as the potential of conductor c remains lower than the sum of the threshold voltages of transistors N5 and N6, these two transistors cannot become conductive.

When the potential of bus conductor c reaches voltage 2Vt, transistors N5 and N6 become conductive and stabilize the potential of conductor c at this preload value 2Vt. If G is considered as the junction of the source of transistor D3 and the source of transistor N2, while H is considered as the junction of the drain of transistor N2 and the gate of transistor N1, it will be understood that, in the above-described condition, junction G is brought substantially to potential 2Vt, while junction H is also brought to this value (N2 being conductive), and transistor N1 is blocked, since its gate voltage does practically no longer exceed its source voltage.

No current is consumed any more in transistor N1; at the worst, current may still be consumed in branch D3, N5, N6, which however includes only small-size transistors having a very low consumption, these transistors being furthermore hardly rendered conductive by voltage 2Vt present in conductor c, whereas transistor N1 must be of a large size and be rendered highly conductive so that rapid preloading can be achieved.

At the end of preloading step a, transistor N2 is blocked (the preloading control signal being no longer applied to its gate), and transistor N1 remains blocked.

During the subsequent complementary step (a or b) transistor N4 is rendered conductive so as to ensure at any rate the blocking of transistor N1, even if bus conductor c is brought to zero by the driving the stage which may apply to said conductor a datum to be transmitted.

Thus it will be understood that this circuit consumes substantially exactly the power which is strictly required for preloading the bus conductor, whichever its equivalent capacity or its previous state may be (obviously a conductor c which is already in state "1" will not induce any power consumption).

The selected voltage 2Vt as preloading voltage may be modified by modifying the arrangement of the branch including transistors N5 and N6: if only N5 was present the preloading voltage would be Vt. With another transistor like N5, inserted between N5 and N6, the voltage would be 3Vt, etc. . . . By selecting transistors having different threshold voltages the field of selection of a preloading voltage value can still be broadened and further modulated.

The invention is not limited to the embodiments described hereinabove and shown in the drawing; many modifications and variants may be envisaged by those skilled in the art, without departing from the spirit and scope of the invention as defined in the appended claims.

I claim:

1. A logic data transfer bus conductor preloading circuit comprising two supply terminals, an output terminal adapted to be connected to said bus conductor, a preloading control input terminal and a preloading inhibiting input terminal, wherein said preloading circuit further comprises a first transistor connected between a first supply terminal and said output terminal, a second transistor connected between the gate of said first transistor and the source of a third transistor, the gate of said second transistor being controlled by the preloading control input, and the drain of said third transistor being connected to the first supply terminal, a fourth transistor connected between the gate of said first transistor and a second supply terminal, the gate of said fourth transistor being controlled by said preloading inhibiting input terminal, a fifth transistor connected in series between the source of said third transistor and said second supply terminal, the gate of said fifth transistor being connected to said output terminal.

2. A preloading circuit according to claim 1, which further comprises a sixth transistor connected in series between said fifth transistor and said second supply terminal, the drain of said sixth transistor being connected to the gate thereof.

3. A preloading circuit according to claim 1, wherein said third transistor is a depletion layer transistor the gate of which is connected to the source thereof.

* * * * *